United States Patent [19]

Uemoto et al.

[11] Patent Number: 5,722,148
[45] Date of Patent: Mar. 3, 1998

[54] APPARATUS AND METHOD FOR ASSEMBLING MOTOR VEHICLE

[75] Inventors: Koji Uemoto; Tsuyoshi Ueda, both of Hiroshima-Ken, Japan

[73] Assignee: Mazda Motor Corporation, Hiroshima, Japan

[21] Appl. No.: 413,028

[22] Filed: Mar. 28, 1995

[30] Foreign Application Priority Data

Mar. 31, 1994 [JP] Japan .................. 6-062777

[51] Int. Cl.$^6$ .................................................. B23Q 3/00
[52] U.S. Cl. ................ 29/468; 29/525.11; 29/787; 29/281.4
[58] Field of Search ............... 29/464, 465, 466, 29/467, 468, 456, 525.11, 719, 787, 795, 810, 240, 281.1, 281.4, 281.5

[56] References Cited

U.S. PATENT DOCUMENTS

| | | | |
|---|---|---|---|
| 4,283,830 | 8/1981 | Gallizio et al. | 29/240 |
| 4,658,501 | 4/1987 | Fujii et al. | |
| 4,875,273 | 10/1989 | Yamamoto | 29/467 |
| 4,876,786 | 10/1989 | Yamamoto et al. | 29/787 |
| 4,894,909 | 1/1990 | Sakamoto et al. | 29/719 |
| 5,105,519 | 4/1992 | Doniwa | 29/240 |
| 5,125,298 | 6/1992 | Smith | |
| 5,456,002 | 10/1995 | Barnhart et al. | 29/787 |

FOREIGN PATENT DOCUMENTS

| | | |
|---|---|---|
| 0 170 086 A3 | 2/1986 | European Pat. Off. |
| 0 335 124 B1 | 10/1989 | European Pat. Off. |
| 0477702 | 4/1992 | European Pat. Off. |
| 63-275487 | 11/1988 | Japan |
| 1-127464 | 5/1989 | Japan |
| 2 213 110 | 8/1989 | United Kingdom |
| 2 221 659 | 2/1990 | United Kingdom |
| 92/07749 | 5/1992 | WIPO |
| 93/22186 | 11/1993 | WIPO |

*Primary Examiner*—David P. Bryant
*Attorney, Agent, or Firm*—Martin Fleit, PA

[57] ABSTRACT

An apparatus for assembling a plurality of components at once to a motor vehicle includes an intermediate jig device. The jig device supports components with keeping locations which correspond to fastening positions on a vehicle body to which the components are to be fastened. The jig device is carried so that the components reach the fastening positions on the vehicle body. An electric nut driver transmits transmitting fastening forces the fastening positions through the jig device.

15 Claims, 20 Drawing Sheets

APPARATUS AND METHOD FOR ASSEMBLING MOTOR VEHICLE

BACKGROUND OF THE INVENTION

1. Field of the Invention

The present invention relates to an apparatus and a method for assembling a motor vehicle and, in particular, to an apparatus and a method for assembling a plurality of components to a vehicle body side in a passenger compartment.

2. Description of the Related Art

Where components including a brake pedal, an accelerator pedal, a clutch pedal and a blower unit of cooler are assembled to a vehicle body side in a passenger compartment, workers conventionally assemble each of the components one by one by hand, since the space in the passenger compartment is too small to employ an industrial robot for assembling the such components.

Japanese Patent Laid-Open No. 63-275487 discloses an apparatus for assembling components to a vehicle body. According to this apparatus, the components for the lower vehicle body put on a movable pallet are assembled to the vehicle body by employing horizontal movement of a jig and a relative vertical movement of the movable pallet and the vehicle body preventing interference between the components and the vehicle body.

Japanese Patent Laid-Open No. 1-127464 discloses an apparatus for assembling components to a vehicle body. According to this apparatus, a pedal bracket is set on a passenger compartment side of a dash panel, and then the pedal bracket and a brake booster which is preset on an engine room side of the dash board are fastened together through the dash panel.

Where the workers assemble each of the components one by one by hand as explained above, an assembling time becomes long and assembling efficiency becomes low. Therefore, it has been necessary to improve the conventional apparatus and method for assembling the components to the vehicle body. Further, there has been a need to provide an apparatus for assembling a plurality of components at the same time so as to reduce the assembling hour and increase the assembling efficiency.

SUMMARY OF THE INVENTION

It is therefore an object of the present invention to provide an apparatus and a method for assembling which can assemble a plurality of components to a vehicle body at the same time.

These and other objects are achieved according to one aspect of the present invention by providing an apparatus for assembling a plurality of components at once to a motor vehicle. The apparatus comprises means for supporting the components with keeping locations which correspond to fastening positions on a vehicle body to which the components are to be fastened, means for carrying the supporting means so that the components reach the fastening positions on the vehicle body, and means for transmitting fastening forces from an electric nut driver to the fastening positions, whereby the components are fastened at the fastening positions on the vehicle body.

According to another aspect of the present invention, there is provided an apparatus for assembling a plurality of components at once to a motor vehicle. The apparatus comprises a conveyor line for carrying vehicle bodies, means for dividing the plurality of components into a plurality of blocks of the components according to fastening positions on the vehicle body, and a plurality of sub-assembling stations provided along the conveyor line. The sub-assembling stations respectively preset one block of the components to respective intermediate jig means and the components are fastened on the fastening positions on the vehicle body.

According to still another aspect of the present invention, there is provided a method of assembling a plurality of components at once to a motor vehicle. The method comprises the steps of providing intermediate jig means which includes means for supporting the components with keeping locations which correspond to fastening positions on a vehicle body to which the components are to be fastened and means for transmitting fastening forces through a plurality of sockets to the fastening positions on the vehicle body, carrying the intermediate jig means so that the components reach the fastening positions on the vehicle body, and fastening the components to the vehicle body by using an electric nut driver connected to the sockets of the intermediate jig means.

The above and other objects and features of the present invention will be apparent from the following description and by making reference to the accompanying drawings employed for illustrating preferred embodiments of the present invention.

DESCRIPTION OF THE PREFERRED EMBODIMENTS

The present invention will now be explained with reference to the preferred embodiments and the drawings.

A first embodiment of the present invention will be explained with reference to FIGS. 1-8.

Figure 1:
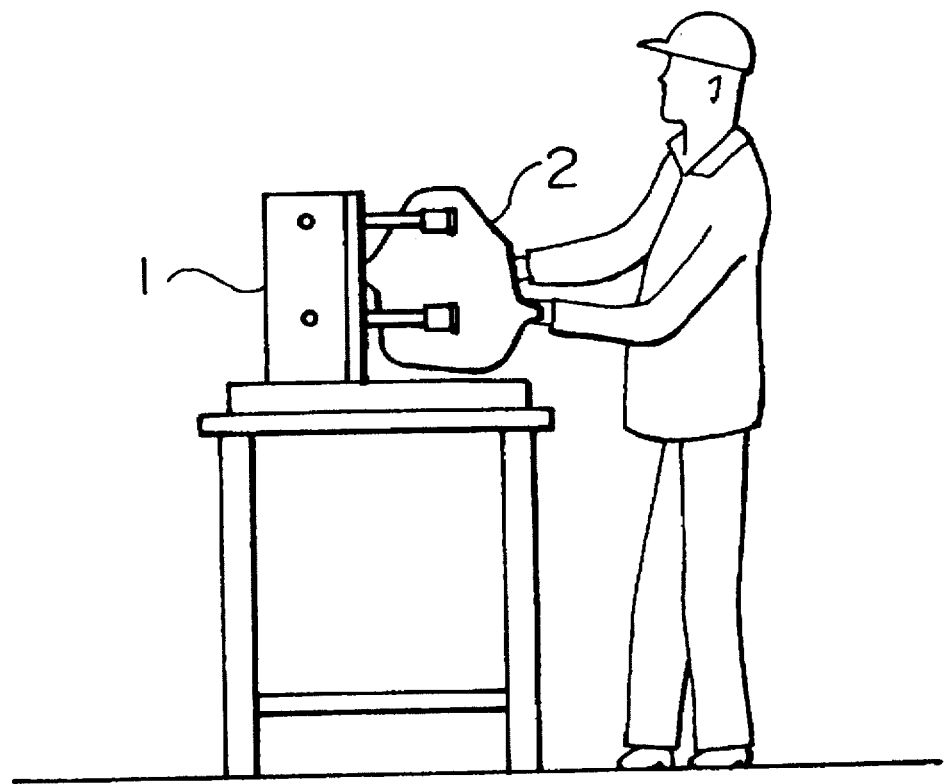
FIG. 1 is a view showing a worker presetting components to an apparatus for assembling according to a first embodiment of the present invention.
Figure 2:
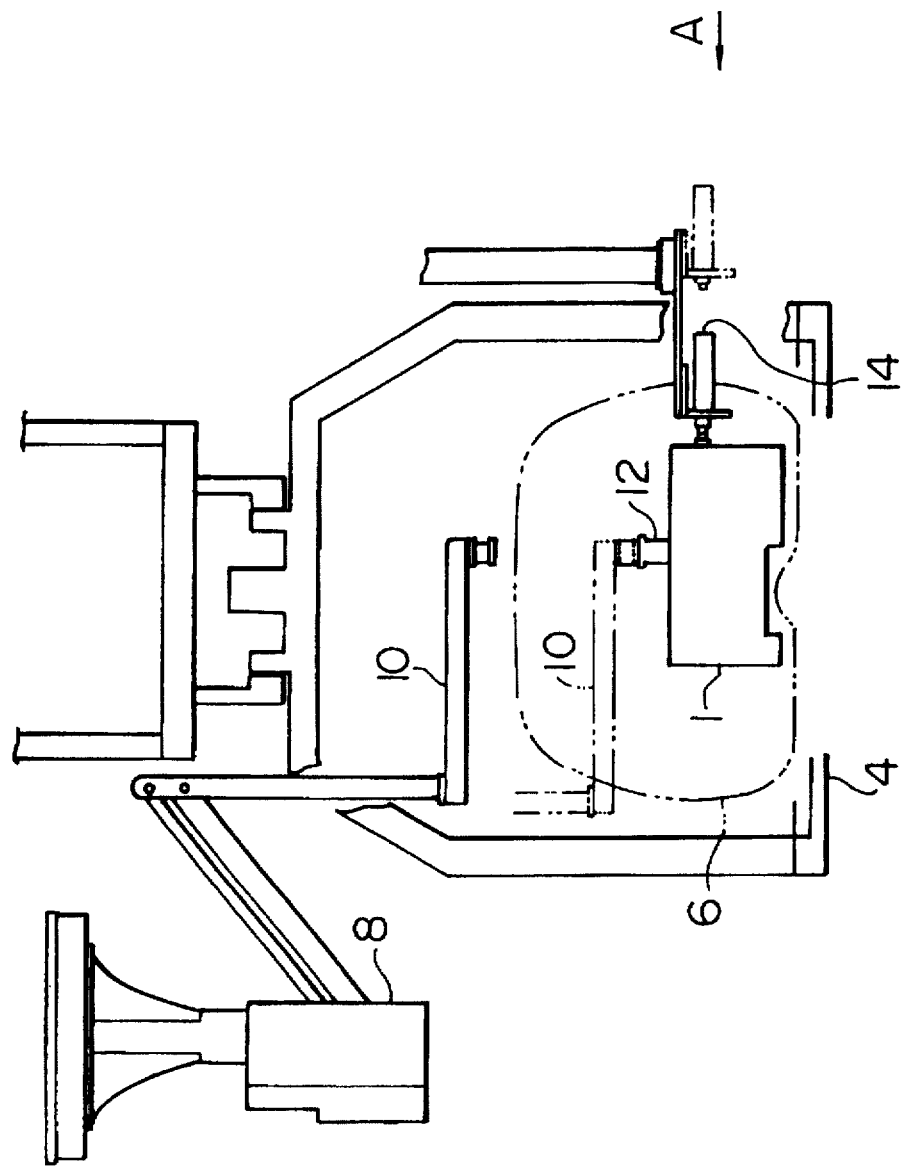
FIG. 2 is a front view showing that an apparatus for assembling is moved into a passenger compartment and then provides driving by an electric nut driver according to the first embodiment of the invention.

As shown in FIG. 1, a worker presets components 2 to an intermediate jig device 1. Thereafter, as shown in FIG. 2, the intermediate jig device 1 on which the components 2 are preset is moved into the passenger compartment of a motor vehicle 6 which is mounted on a belt conveyor 4. An industrial robot 8 is provided with an arm 10 which is connected with a carriage frame 12 of the intermediate jig device 1 and carries the intermediate jig device 1 into the passenger compartment. Thus, the intermediate jig device 1 is moved into the passenger compartment of the motor vehicle, and finally the components 2 are fastened to predetermined fastening positions of a vehicle body by operating an electric nut driver 14 driven by an electric motor.

Figure 3:
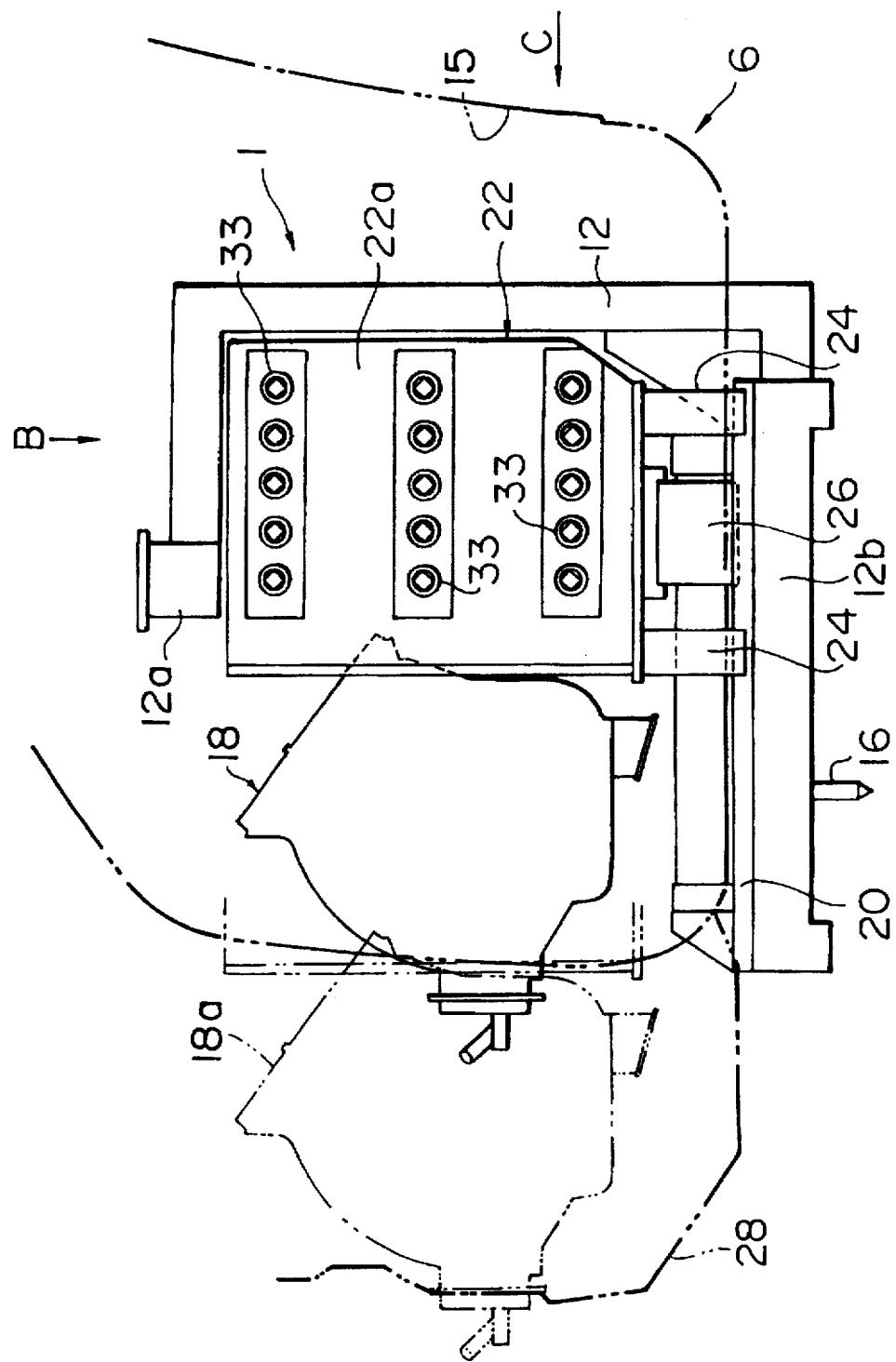
FIG. 3 is a side view of an apparatus for assembling as seen from direction A in FIG. 2 according to the first embodiment of the invention.

Next, the intermediate jig device 1 will be explained in detail in accordance with FIGS. 3-5. FIG. 3 is a side view of the intermediate jig device 1 as seen from the A direction in FIG. 2, FIG. 4 is a plan view of the intermediate jig device 1 as seen from the B direction in FIG. 3, and FIG. 5 is a front view of the intermediate jig device 1 as seen from the C direction in FIG. 3.

Referring to FIG. 3, the intermediate jig device 1 is moved into the passenger compartment through a door opening 15. The intermediate jig device 1 is provided with the carriage frame 12 which is integrally connected to the intermediate jig device 1. The upper end of the frame 12 is held by the arm 10 of the robot 8. The frame 12 of the intermediate jig device 1 includes a positioning pin 16 on an under surface thereof for positioning the intermediate jig device 1 in the passenger compartment so that the intermediate jig device 1 is fixed on a predetermined position in the passenger compartment. FIG. 3 shows only a heater unit 18 as one of the components 2, but a plurality of the components 2 are actually preset on the jig device 1.

The carriage frame 12 has a horizontal portion 12a, extending horizontally under the intermediate jig device 1, on which a pair of rails 20 are disposed to extend in a front-rear direction of the vehicle body. The intermediate jig device 1 is further provided with a main frame 22 with leg portions 24 which are disposed so as to be slidable on the rails 20. An air cylinder 26 is provided between the main frame 22 and the rails 20 and moves the main frame 22 with the preset components 2 in the front-rear direction of the vehicle body. In FIG. 3, the heater unit 18a depicted by a chain line shows a position at which the heater unit 18 is finally fastened to a vehicle body side 18.

Figure 4:
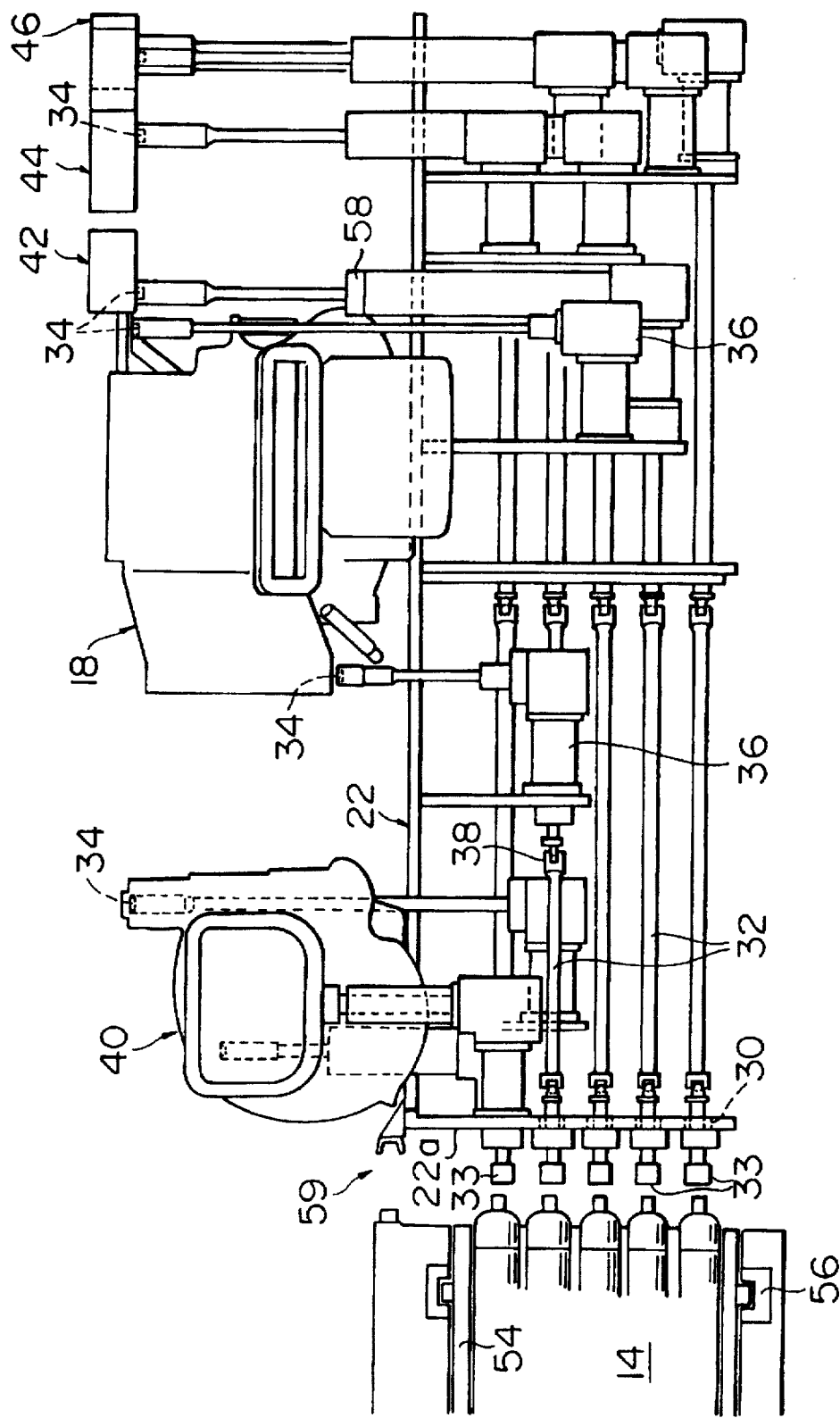
FIG. 4 is a plan view of an apparatus for assembling as seen from direction B in FIG. 3 according to the first embodiment of the invention.
Figure 5:
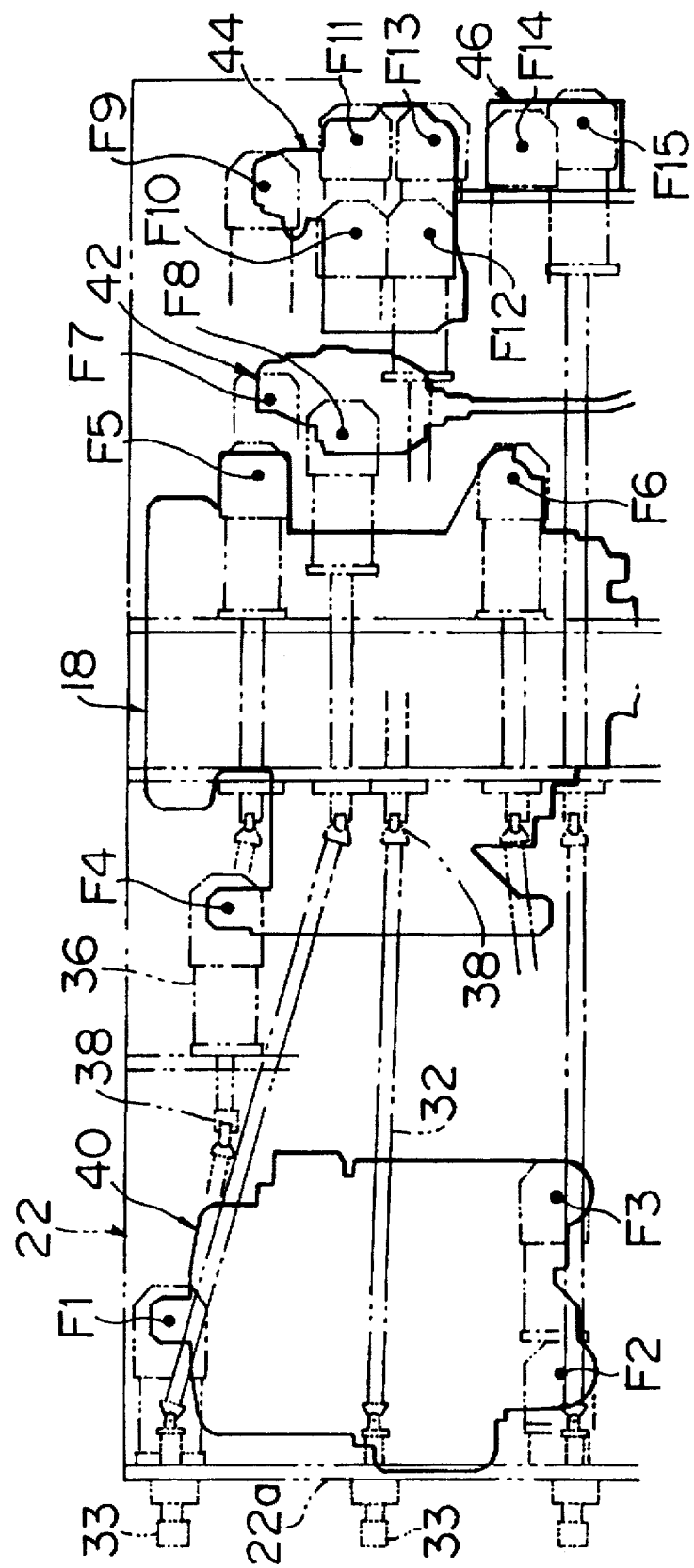
FIG. 5 is a front view of an apparatus for assembling as seen from direction C in FIG. 3 according to the first embodiment of the invention.

Referring to FIGS. 4 and 5, fifteen shafts 32 for transmitting fastening forces is attached to the main frame 22 of the intermediate jig device 1 through bearings 30. All of the first ends or input sides of the shafts 32 are provided on a surface 22a located at the door opening 15, and fifteen sockets 33 are attached on the respective first ends of the shafts 32. As shown in FIG. 3, the sockets 33 and the shafts 32 are divided among three blocks each of which has five sockets. The electric nut driver 14 is a multiple-shaft electric driver which can drive the five sockets 33 and the shafts 32 at the same time so as to fasten the components 2 on five positions of the vehicle body side 28. The fifteen sockets 33 and the shafts 32 are driven to fasten the components 2 on the predetermined fifteen positions of the vehicle body side 28 by three operations of the electric nut driver 14. That is, after completing a drive of one block of the sockets 33 and the shafts 32, the multiple-shaft electric nut driver 14 moves back along a horizontal guide 54 from the sockets 33, and then moves down along a vertical guide 56 to drive the next block of the sockets 33.

The other ends or output sides of the shafts 32 are disposed so as to fit the positions of the vehicle body side 28 at which the components 2 are fastened. The other ends of the shafts 32 are respectively provided with nuts 34 (see FIG. 4) which are fastened to bolts (not shown) mounted on the vehicle body side 28. The shafts 32 are further provided with bevel gears 36 (see FIG. 4) for changing the direction of the fastening forces input by the electric nut driver 14 by an angle of ninety degrees and universal gears 38 (see FIG. 5) for changing the direction of the fastening forces by angles of predetermined degrees. The directions of the fastening forces are changed by the angles of the predetermined degrees by the universal joints 38 and then are changed by the angle of ninety degrees by the bevel gears 36.

As shown in FIG. 4, torque sensors 58 are attached on the front portions of the respective shafts 32. The drive torques of the respective shafts 32 are controlled to be predetermined values based on the outputs of the torque sensors 58. An electric connector 59 is provided between the frame 61 and the electric nut driver 14 so that the outputs of the torque sensors 58 are transmitted to the electric nut driver 14 when the electric nut driver 14 is connected with the sockets 33.

As shown in FIGS. 4 and 5, a blower unit 40, a heater unit 18, a clutch unit 42, a brake pedal 44 and an accelerator pedal 46 as the plurality of components 2 are preset on the intermediate jig device 1. F1, F2 ... F15 in FIG. 5 shows fastening positions of the vehicle body corresponding to the output sides of the respective shafts 32.

Figure 6:
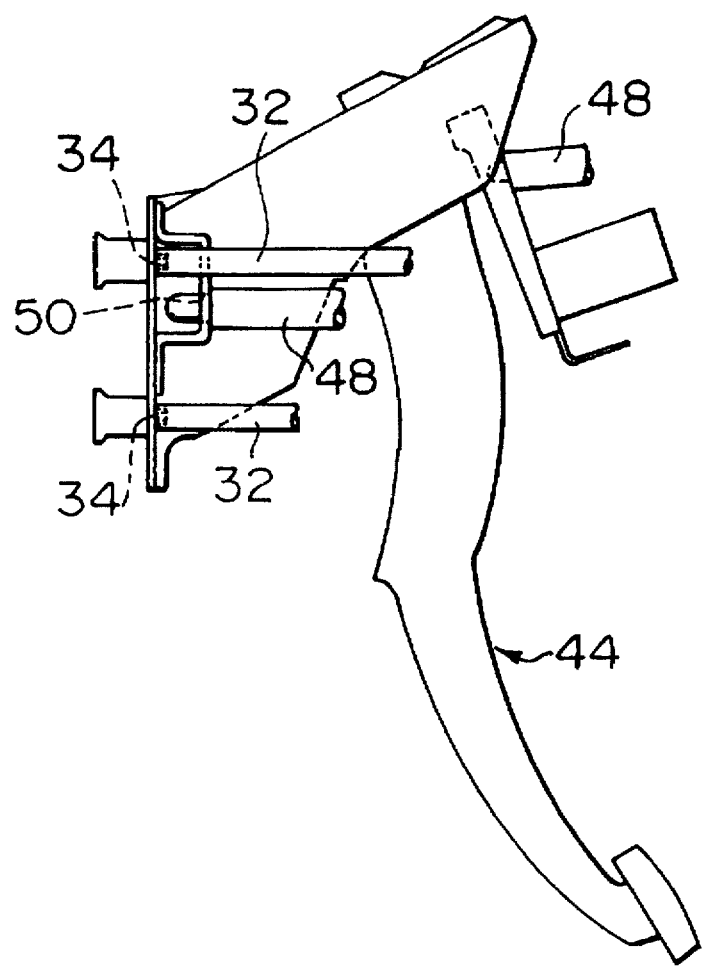
FIG. 6 is a side view showing that a brake pedal, among a plurality of components, has been preset.

FIG. 6 is a side view showing that the brake pedal 44 has been preset on the intermediate jig device 1. As shown in FIG. 6, the main frame 22 of the intermediate jig device 1 is provided with a plurality of positioning pins 48 for presetting the corresponding respective components 2 such as the brake pedal 44 and the like. On the other hand, the components 2 are respectively provided with positioning openings 50 in which the positioning pins 48 are respectively inserted so that the respective components 2 are preset on the intermediate jig device 1. FIG. 6 shows the shafts 32 and the nuts 34 disposed in the other ends or output sides of the shafts 32.

Figure 7:
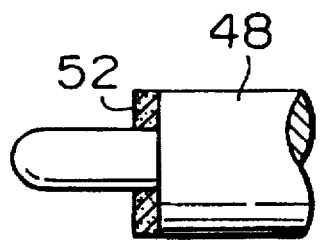
FIG. 7 is a side view of a positioning pin for presetting.

As shown in FIG. 7, the positioning pins 48 are provided with magnets 52 which contact with the components 2. Where the component 2 is made out of magnetic material, the component 2 is much firmly preset to the intermediate jig device 1 by the magnetic force.

Next, a method for assembling or fastening the components 2 to the vehicle body side in the compartment by employing the intermediate jig device 1 will be explained.

Referring to FIGS. 1, 6 and 7, near the belt conveyor 4, the worker presets the components 2 including the blower unit 40, the heater unit 18, clutch pedal 42, the brake pedal 44 and the accelerator pedal to the intermediate jig device 1 by inserting the positioning pins 48 into the positioning openings 50 of the intermediate jig device 1.

Next, the arm 10 of the industrial robot 8 holds the carriage frame 12 of the intermediate jig device 1 and then moves the jig device 1 into the passenger compartment of the motor vehicle 6 through the door opening 15. The intermediate jig device 1 is positioned at a predetermined position in the passenger compartment by using the positioning pin 16.

Thereafter, the air cylinder 26 moves the intermediate jig device 1 together with the preset components 2 toward the front side of the vehicle on the rails 20, and the intermediate jig device 1 with the preset components 2 reaches the predetermined fastening positions of the vehicle body.

At the fastening positions, the electric nut driver 14 is attached to the sockets 33 on the surface 22a of the intermediate jig device 1, and then the fastening force of the electric nut driver 14 is transmitted to the shafts 32 through the sockets 33. As a result, the nuts 34 provided on the outlet sides of the shafts 32 are fastened to bolts (not shown) on the vehicle body side 28. Thus, a plurality of the components 2 is fastened at the fastening positions at the same time, to the vehicle body 28.

In the first embodiment of the invention, the electric nut driver 14 drives the five sockets 33 at the same time. Three times of operation of the electric nut driver 14 are necessary to drive all of the fifteen sockets 33. An electric nut driver may be employed which drives all of the fifteen sockets 33 at the same time so that only one time of operation of the electric nut driver is necessary.

Figure 8:
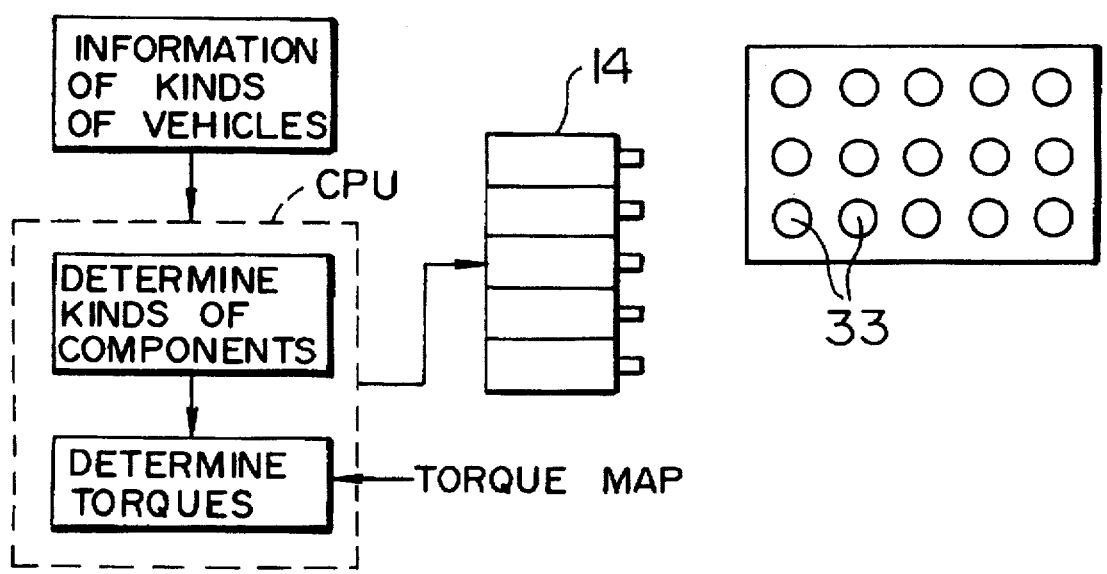
FIG. 8 is a view showing a controller of an electric nut driver according to the first embodiment of the invention.

A controller of the electric nut driver 14 employed in the first embodiment will be explained with reference to FIG. 8. As shown in FIG. 8, information of kinds of motor vehicles in a main controller is input to CPU in the nut driver controller. The CPU determines components to be fastened based on the information, while the components are preset automatically or by hand on the locations of the supporting members corresponding to the fastening positions. Then the CPU determines respective fastening torques of the corresponding components. Then, the electric nut driver 14 is operated to generate the torques based on the information of the fastening torques so that the respective five shafts 32 rotate three times.

Figure 9:
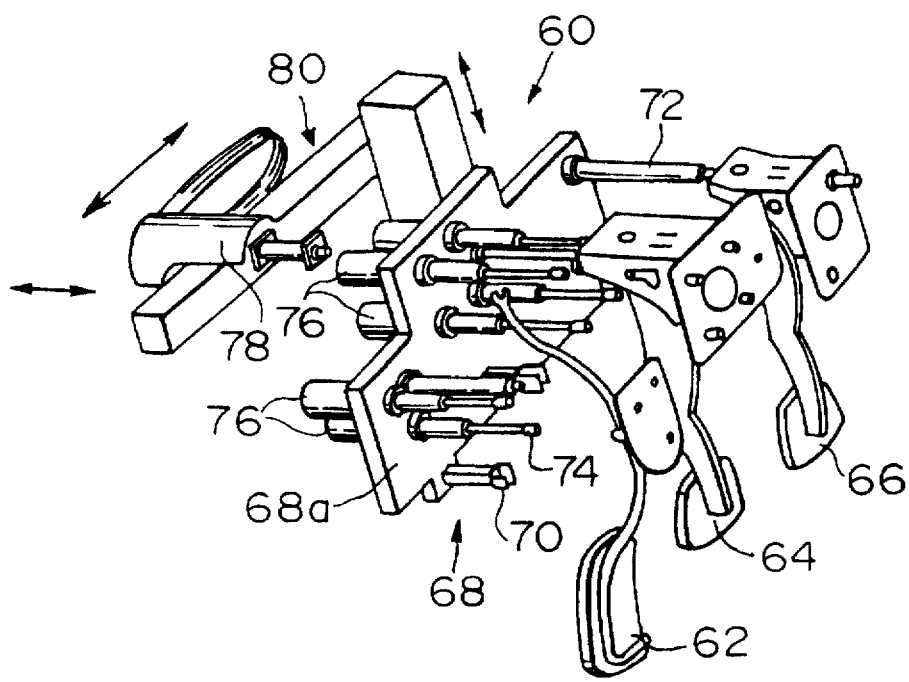
FIG. 9 is a perspective view showing an apparatus for assembling according to a second embodiment of the invention.
Figure 10:
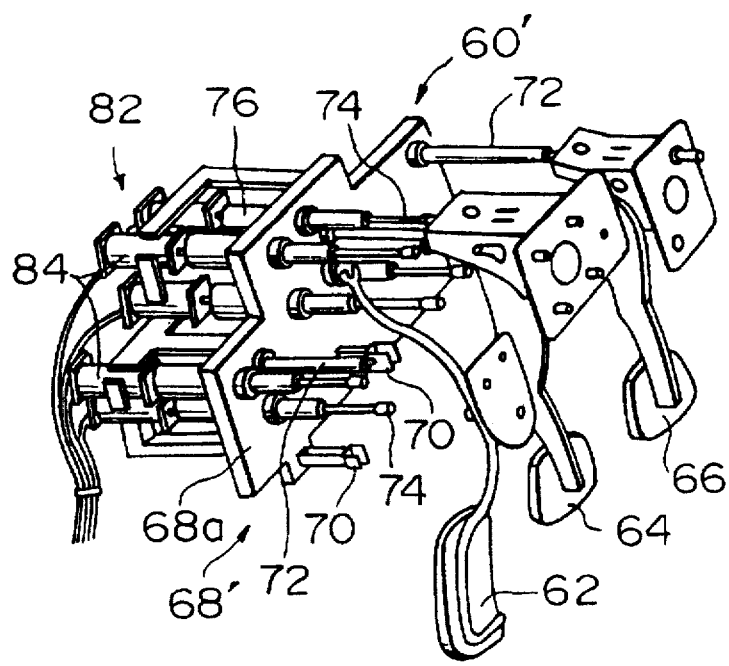
FIG. 10 is a perspective view showing an apparatus for assembling according to another example of the second embodiment of the invention.

A second embodiment of the present invention will be explained with reference to FIGS. 9 and 10. As shown in FIG. 9, an intermediate jig device 60 is employed to assemble an accelerator pedal 62, a brake pedal 64 and a clutch pedal 66 to the passenger compartment side of a dashboard panel at once.

The intermediate jig device 60 includes a base portion (not shown) fixed in the passenger compartment of a vehicle and an assembling portion 68 which is movable horizontally. A plurality of components including the accelerator pedal 62, the brake pedal 64 and the clutch pedal 66 are preset, so as to correspond the fastening positions of the vehicle body, on a plurality of supporting members 70 projecting from a base plate 68a of the assembling portion 68 of the intermediate jig device 60. The base plate 68a of the intermediate jig device 60 is provided with a plurality of positioning pins 72 which are to be inserted into positioning openings provided on the vehicle body side. In order to understand easily the intermediate jig device 60, the components 62–64 are pictured apart from the assembling portion 68 in FIG. 9.

The base plate 68a of the jig device 60 is further provided with many shafts 74 for transmitting fastening forces which are provided parallel to each other and hold nuts on front ends thereof. The shafts 74 are provided on other ends thereof with sockets 76 to which an electric nut driver 78 is connected. An industrial robot 80 with three orthogonal axes is provided with one electric nut driver 78, and moves in order to connect the nut driver 78 with the respective sockets 76 of the shafts 74. Then, the nut driver 78 fastens the nuts held on the front ends of the shafts 74 in order. The fastening torque of the nut driver 78 can be changed according to the components.

According to the second embodiment of the present invention, since the one electric nut driver 78 is provided so as to move against the intermediate jig device 60 and to transmit the fastening forces to the shafts 74, the intermediate jig device 60 can be small-sized. According to the second embodiment, the shafts 74 may hold bolts on the front ends thereof in which the shafts 74 also work as supporting members of the components.

Another example of the second embodiment of the present invention will be explained with reference to FIG. 10. As shown in FIG. 10, a multiple-shaft electric nut driver 82 is provided instead of the one electric nut driver 78 shown in FIG. 9. The multiple-shaft electric nut driver 82 is provided with a plurality of electric nut drivers 84 which are to be connected to the respective sockets 76 of the intermediate jig device 60'. The fastening forces of the respective electric nut driver 84 are provided beforehand based on the kinds of the components to be fastened thereby.

Figure 11:
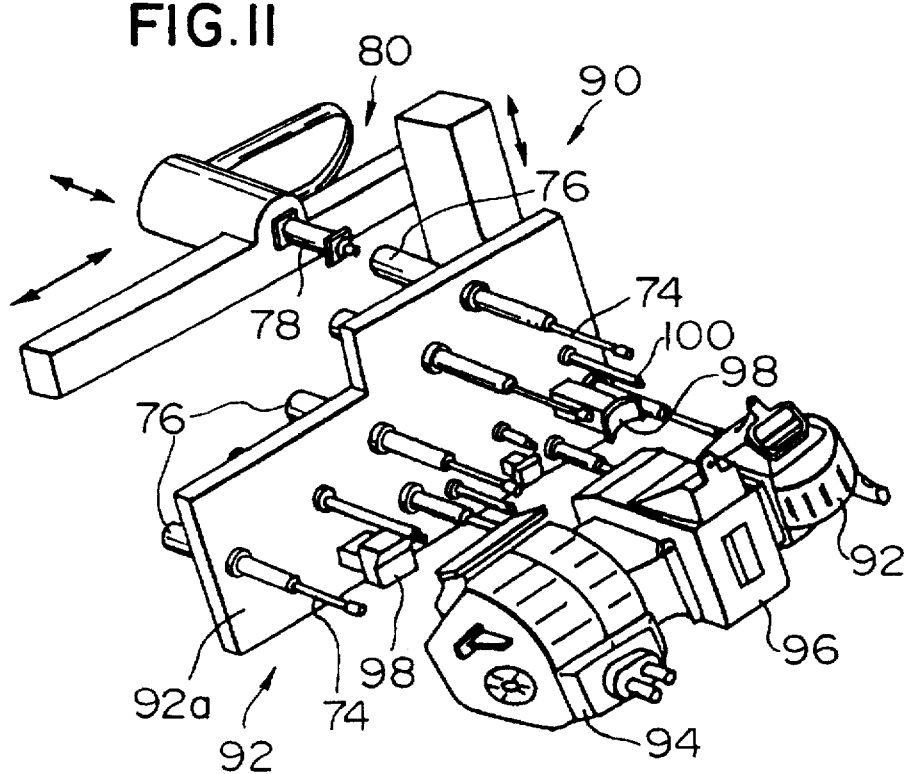
FIG. 11 is a perspective view showing an apparatus for assembling according to a third embodiment of the invention.
Figure 12:
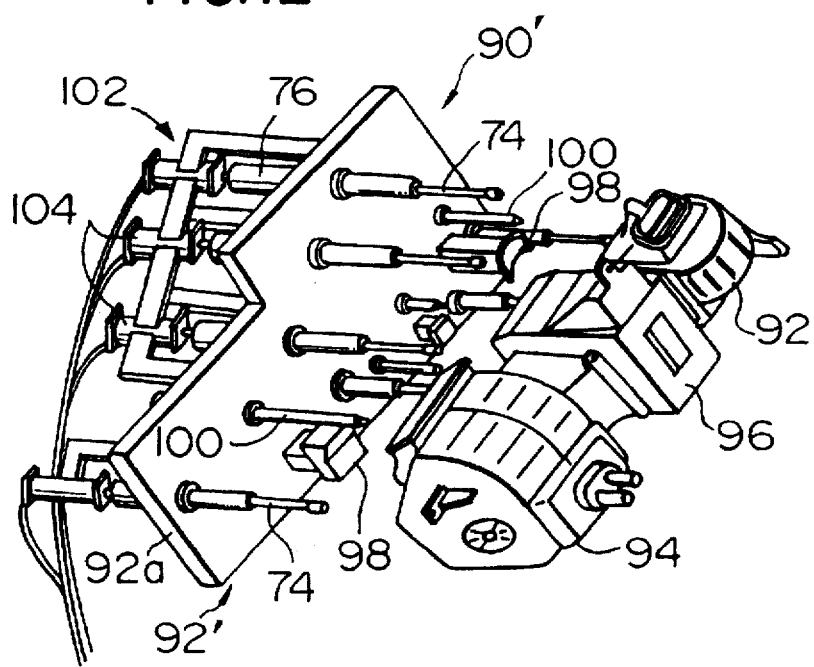
FIG. 12 is a perspective view showing an apparatus for assembling according to another example of the third embodiment of the invention.

A third embodiment of the present invention will be explained with reference to FIGS. 11 and 12. As shown in FIG. 11, an intermediate jig device 90 is employed to assemble at once a blower unit 92 and a heater unit 94 for air conditioning. Both of these units are connected to each other by a cooler unit 96 in advance.

The blower unit 92 and the heater unit 94 are preset, so as to correspond to the fastening positions of the vehicle body, on a plurality of supporting members 98 provided on a base plate 92a of an assembling portion 92 of the intermediate jig device 90. The base plate 92a of the intermediate jig device 90 is provided with a plurality of positioning pins 100.

The base plate 92a of the jig device 90 is further provided with many shafts 74, for transmitting fastening forces, which are provided parallel to each other and hold nuts on front ends thereof. The shafts 74 are provided on other ends thereof with sockets 76 to which the electric nut driver 78 is connected. An industrial 80 robot with three orthogonal axes is provided with one electric nut driver 78 and moves in order so as to connect the nut driver 78 with the respective sockets 76 of the shafts 74. Then, the nut driver 78 fastens the nuts held on the front ends of the shafts 74 in order. The fastening torque of the nut driver 78 can be changed according to the kinds of the components. The robot 80 can control the nut driver 78 according to the kinds of the vehicle bodies.

Another example of the third embodiment of the present invention will be explained with reference to FIG. 12. As shown in FIG. 12, a multiple-shaft electric nut driver 102 is provided instead of the one electric nut driver 78 shown in FIG. 11. The multiple-shaft electric nut driver 102 is provided with a plurality of electric nut drivers 104 which are to be connected to the respective sockets 76 of the intermediate jig device 90'. The fastening forces of the respective electric nut driver 102 are provided beforehand based on the kinds of the components to be fastened thereby.

Figure 13:
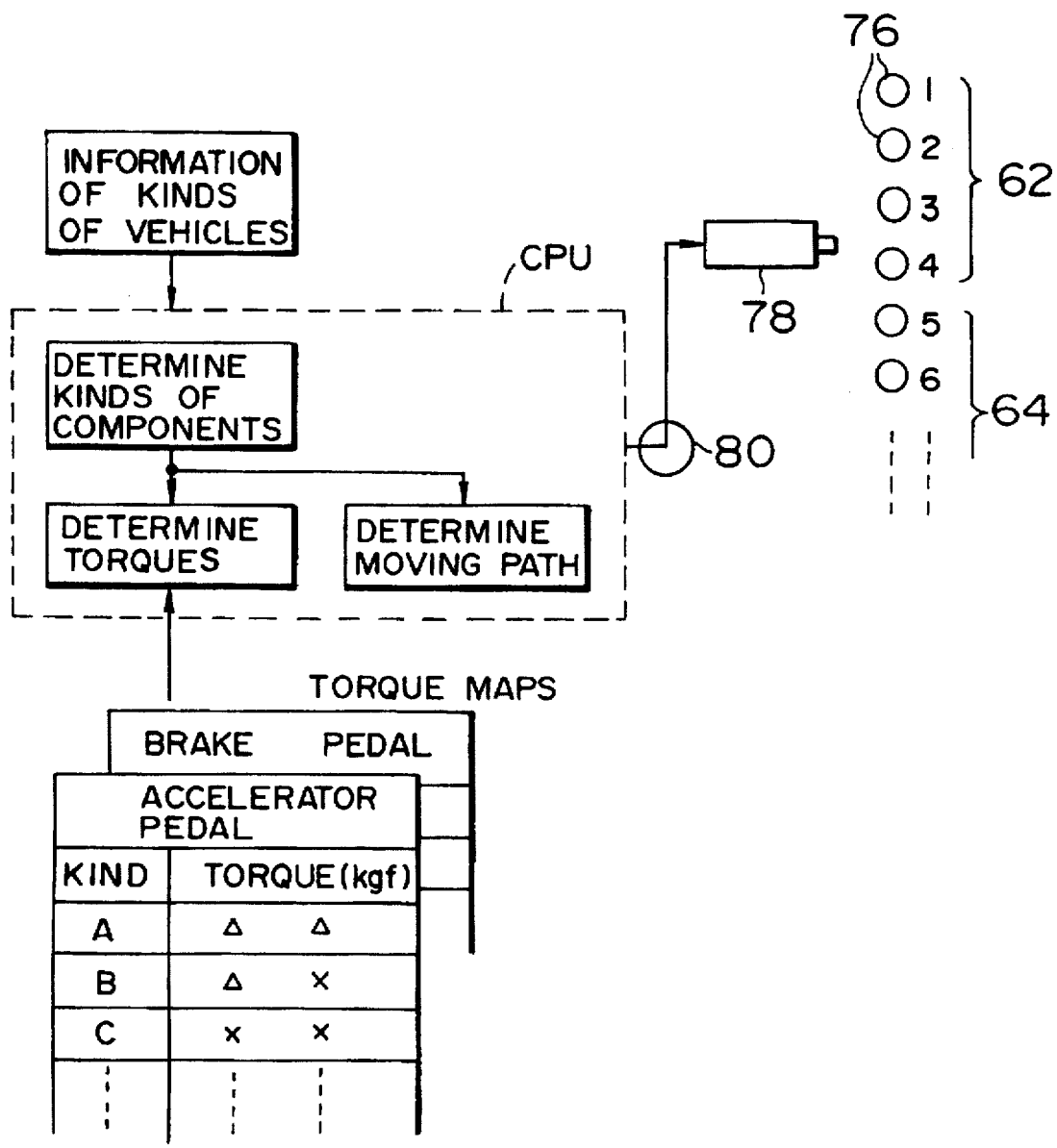
FIG. 13 is a view showing a controller of an electric nut driver according the third embodiment of the invention.

The controller of the electric nut driver 78 will be explained with reference to FIG. 13. As shown in FIG. 13, information of kinds of motor vehicles in a main controller is input to CPU in the nut driver controller. The CPU determines components to be fastened based on the information. The components are preset on the supporting members, so as to correspond to the fastening positions of the vehicle body, automatically or by hand. Then the CPU determines respective fastening torques of the corresponding components and determines a moving path of the nut driver 78 based on maps prepared beforehand. Then, the robot 80 is controlled based on the information of the moving path, and the nut driver 78 is operated to generate the torques based on the information of the fastening torques.

Figure 14:
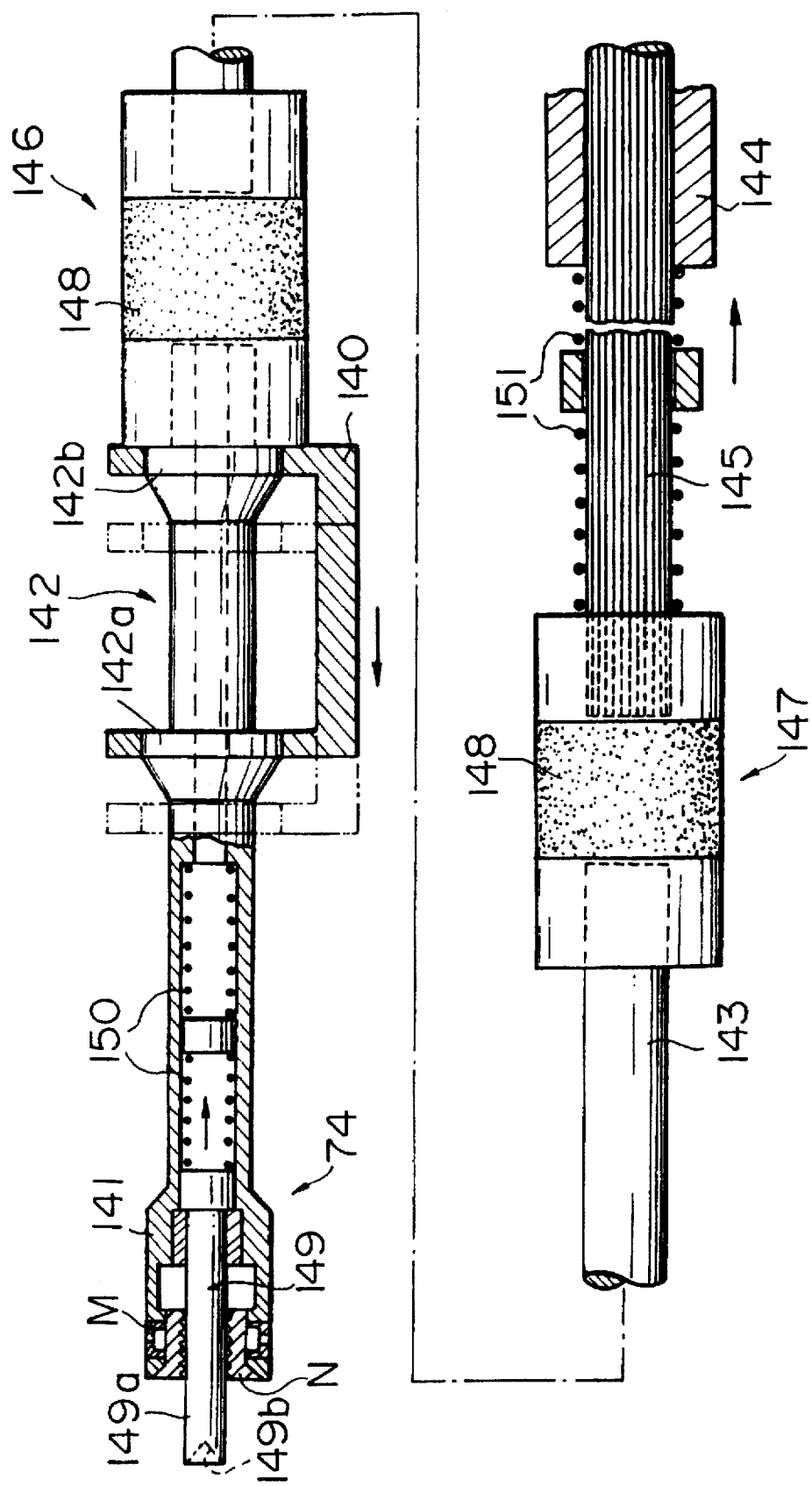
FIG. 14 is a partial cross sectional view showing a shaft for transmitting fastening forces according to the embodiments of the invention.

The shafts 74 for transmitting the fastening torques explained above will be further explained in detail with reference to FIG. 14. As shown in FIG. 14, the shaft 74 includes a socket portion 141 on the front end thereof, a fixing portion 142, an intermediate rod 143, a spline shaft 145 which is movably connected with a sleeve 144 to be connected with the nut driver 78, and respective flexible couplings 146 and 147 with resilient members 148 for coupling the fixing member 142 and the intermediate rod 143 and coupling the intermediate rod 143 and the spline shaft 145. The fixing portion 142 includes a fixing member 140 movable in an axial direction, and fixing flanges 142a and 142b tightly contacting with the fixing member 140 when the fixing portion 142 is positioned at the fixing position or the backward position shown as a solid line in FIG. 14.

The socket portion 141 of the shaft 74 holds a nut N therein by using magnetic force of a magnet M mounted therein. The socket portion 141 is further provided with a slidable pin 149 which extends to penetrate the nut N. The pin 149 is biased in the front direction by a spring 150 so that the pin 149 extends beyond the socket portion 142. The pin 149 has a projecting portion 149a which penetrates an opening (not shown) which is provided in the component and through which a bolt mounted on the vehicle body side is to be inserted. The projection portion 149a is provided on the front end thereof with a hollow portion 149b with which the front end of the bolt mounted on the vehicle body side contacts.

The spline shaft 145 is provided on an outer surface thereof with a spring 151 which is mounted between the flexible coupling 147 and the sleeve 144 for biasing the socket portion 141 to the front direction.

In operation, the shaft 74 reaches the fastening position at which the component is to be fastened to the bolt on the vehicle body side by using the nut N, while the assembling portion of the intermediate jig device moves on the base portion. At this time, the fixing flanges 142a and 142b of the fixing portion 140 are tightly contacting with the fixing member 140 and the projecting portion 149a of the slidable pin 149 has been inserted in the opening of the component. At the fastening position, since the bolt is preset on the vehicle body side according to the location of the opening of the component, the hollow portion 149a of the slidable pin 149 contacts with the front portion of the bolt and then the pin 149 is moved backward against the spring 150 by the movement of the assembling portion of the intermediate jig device. Then, the bolt is inserted in the opening of the component and the nut N is located to contact with the front end of the bolt by the biasing force of the spring 151. Thereafter, the shaft 74 is placed in a floating condition by releasing the fixing portion 142 as shown by a two-dot chain line in FIG. 13. Finally, the electric nut driver is operated so that the shaft 75 is rotated to fasten the component to the vehicle body side by the nut N being fastened to the bolt.

Figure 15:
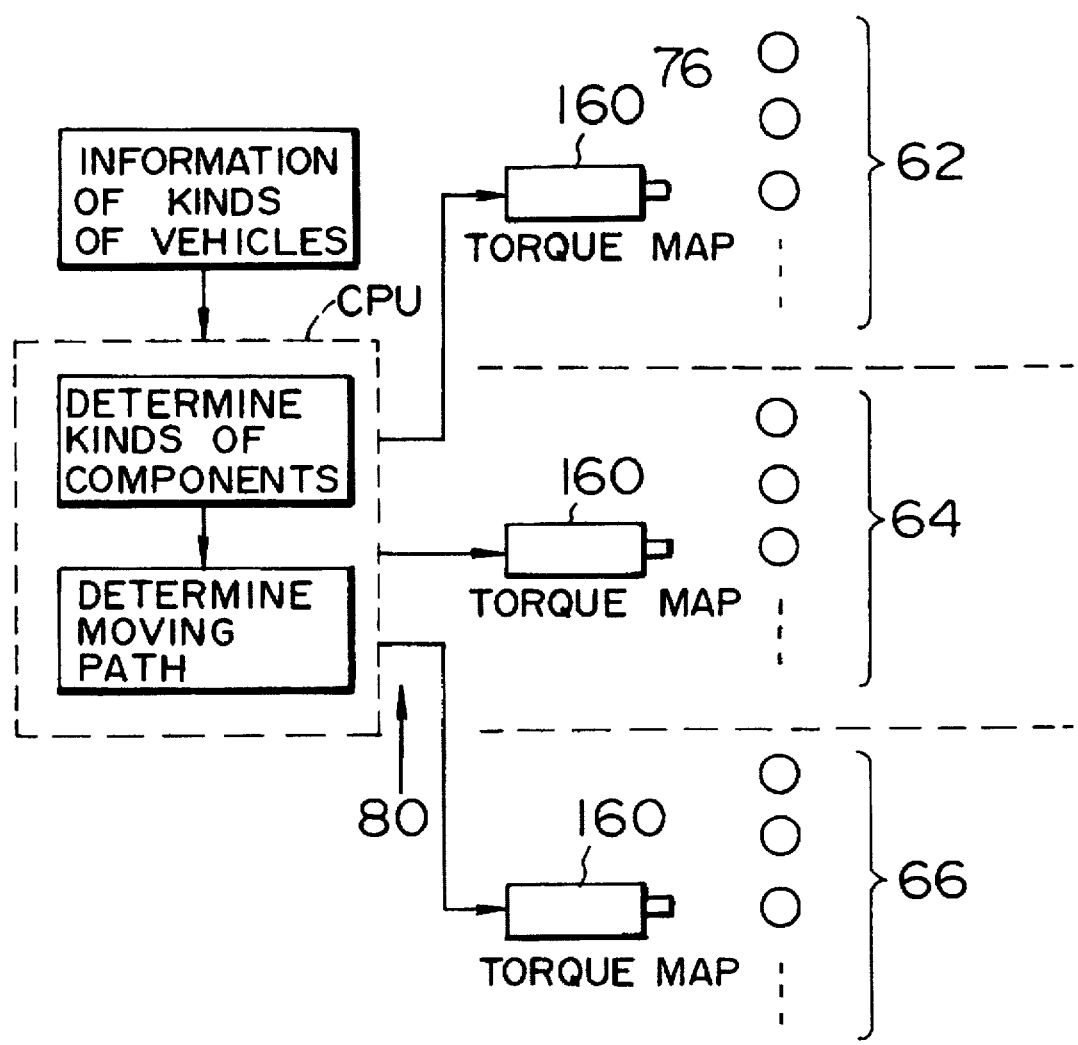
FIG. 15 is a view showing a controller of an electric nut driver according to a fourth embodiment of the invention.

A fourth embodiment of the present invention will be explained with reference to FIG. 15. As shown in FIG. 15, three electric nut drivers 160 are provided which correspond to each of the components including the accelerator pedal 62, the brake pedal 64 and the clutch pedal 66. The respective three nut drivers 160 are controlled based on respective three torque maps which determine fastening torques of the respective components 62, 64 and 66.

Figure 16:
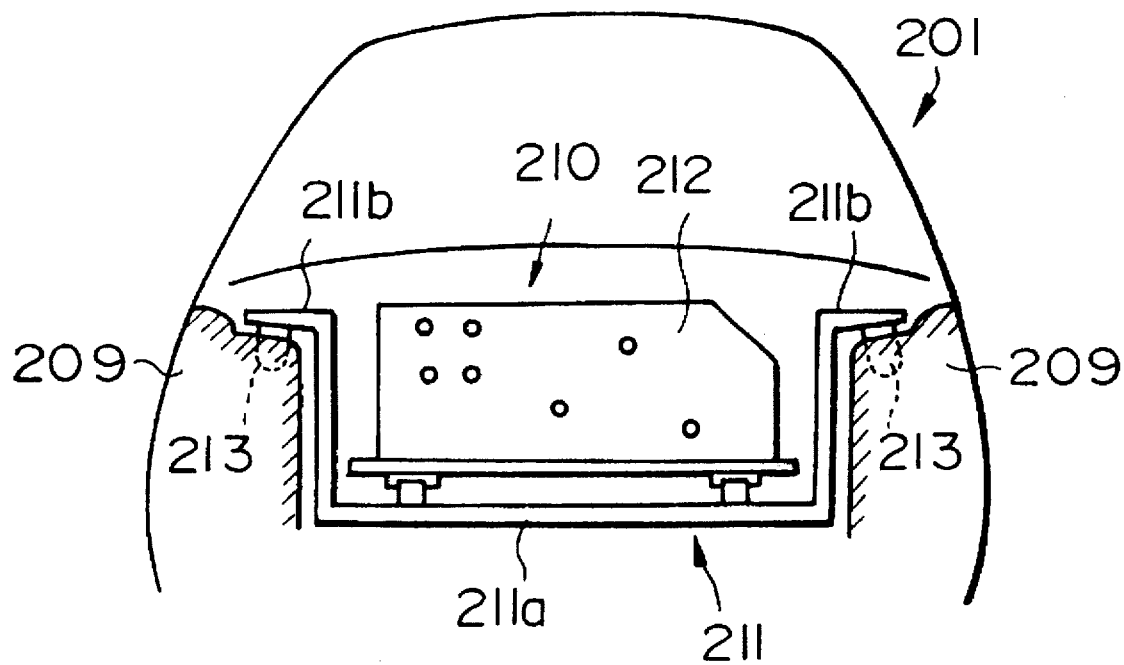
FIG. 16 is a front view showing an apparatus for assembling according to a fifth embodiment of the invention.
Figure 17:
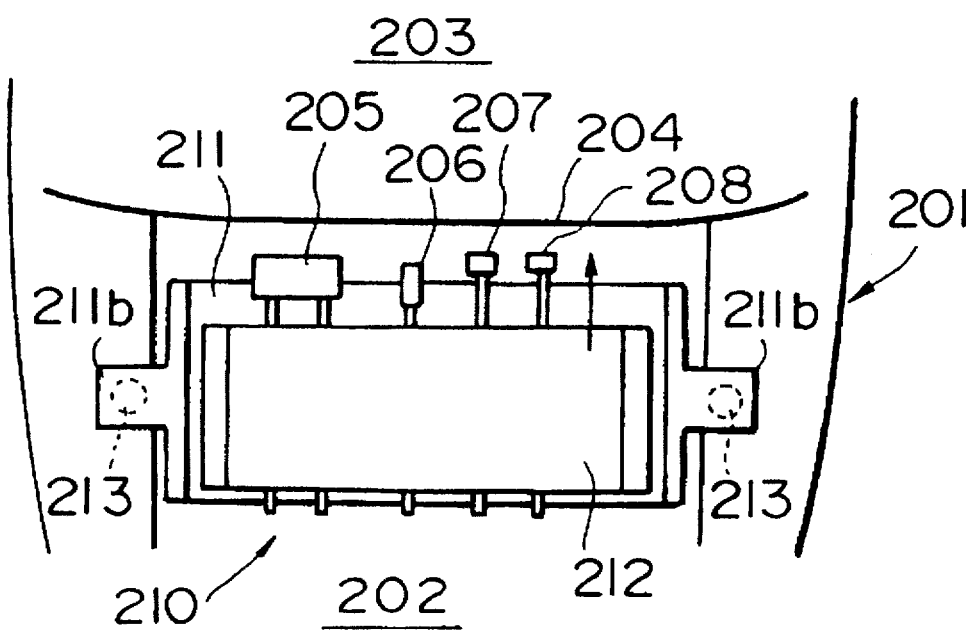
FIG. 17 is a plan view of FIG. 16.
Figure 18:
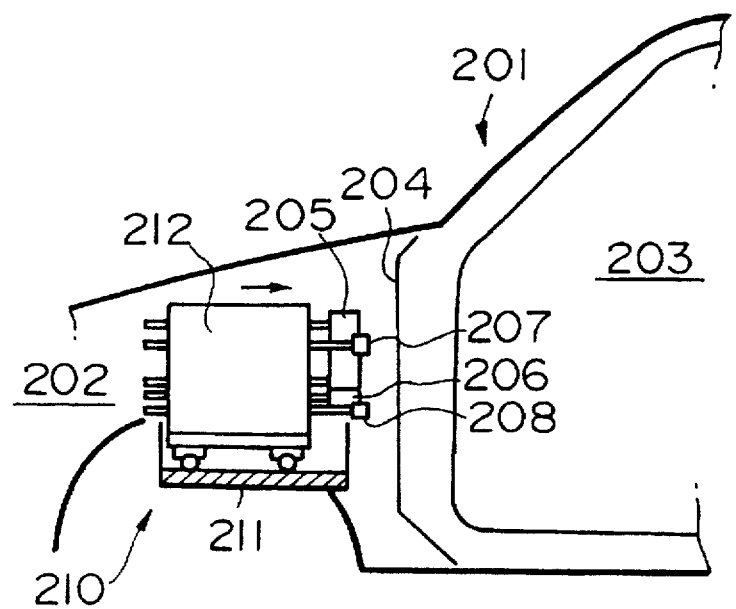
FIG. 18 is a side view of FIG. 16.

A fifth embodiment of the present invention will be explained with reference to FIGS. 16–18. As shown in FIGS. 16–18, a vehicle body 201 is divided into an engine room 202 and a passenger compartment 203 by a dash panel 204. An intermediate jig device 210 is provided to fasten a plurality of components to the engine room side surface of the dash panel 204. The components include a so-called master bag or a brake booster 205, a master cylinder 206, an oil filter, a charcoal canister 208 and the like.

The intermediate jig device 210 is mounted in the engine room 202 and is provided with a base portion 211 fixed in the engine room 202 and an assembling portion 212 which is movable on the base portion 211 and carries the plurality of the components to the assembling position to assemble the components.

The base portion 211 of the jig device 210 is positioned to be fixed in the engine room 203 by using openings provided on the top portions of right and left suspension towers or strut towers 209 before mounting suspension devices on the strut towers 209. That is, the base portion 211 is provided with a flat base plate 211a and a pair of supporting arms 211b. The supporting arms 211b extend vertically from both ends of the base plate 211a and extend horizontally from the tops thereof to the vehicle body width direction. The supporting arms 211b include positioning bosses 213 projecting downwardly on the top portion thereof to be inserted into the openings of the strut towers 209.

The assembling portion 212 of the jig device 210 is horizontally movable on the base plate 211a of the base portion 211 toward the dash panel 204. The assembling portion 212 is provided with a supporting means for supporting the plurality of components 205–208 and the like while keeping the positions of the components corresponding to the fastening positions of the components.

The assembling portion 212 is further provided with a means for transmitting fastening forces such as the shafts 32 in FIG. 4. The assembling portion 212 moves on the base portion 211 toward the dash panel 204 for carrying the components 205-208 and the like to the fastening positions and fastens the components to the dash panel 204 by using the fastening forces applied by the electric nut driver (not shown) through the shafts 32 (shown in FIG. 4).

Figure 19:
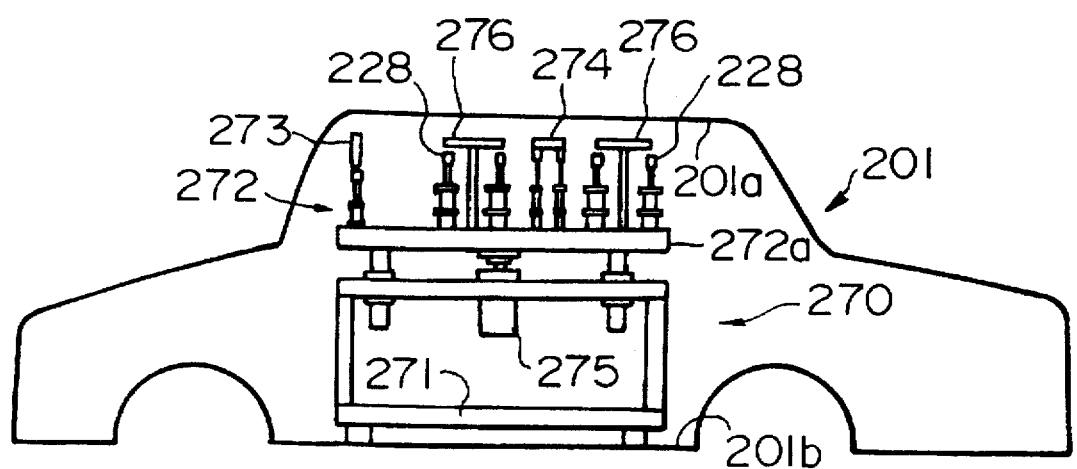
FIG. 19 is a side view showing an apparatus for assembling according to a sixth embodiment of the invention.
Figure 20:
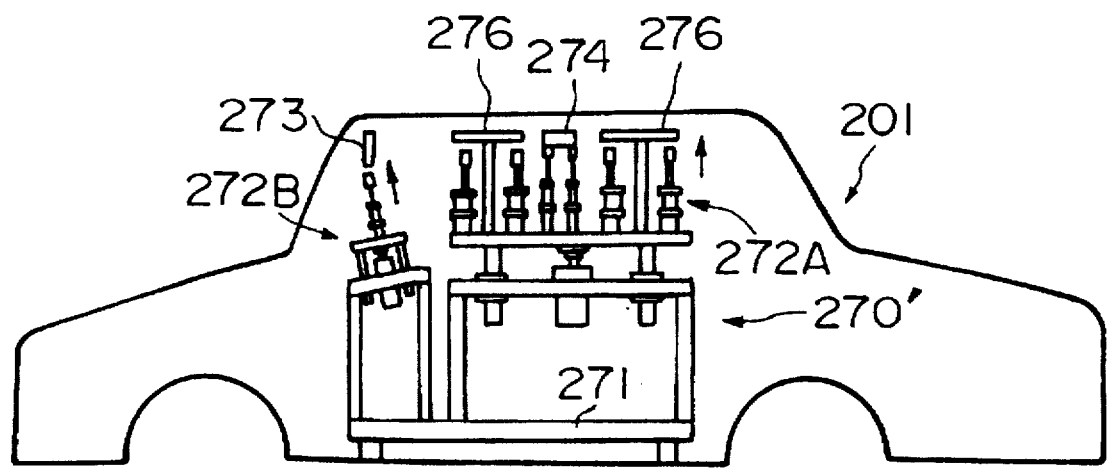
FIG. 20 is a side view showing an apparatus for assembling according to another example of the sixth embodiment of the invention.

A sixth embodiment of the present invention will be explained with reference to FIGS. 19 and 20. As shown in FIG. 19, an intermediate jig device 270 is provided to fasten a plurality of components to a roof 201a in the passenger compartment of the vehicle body 201. The components includes a sunvisor 273, a room lamp 274, passenger handles 276 and the like.

The intermediate jig device 270 is mounted in the passenger compartment and is provided with a base portion 271 fixed on the predetermined location of a floor 201b in the passenger compartment and an assembling portion 272 having a cylinder 275. The assembling portion 272 is vertically movable on the base portion 271 and carries the plurality of components to the fastening positions on the roof 201a to fasten the components.

The assembling portion 272 is provided with a supporting means (not shown) for supporting the plurality of components 273, 274, 276 and the like while keeping the positions of the components corresponding to the fastening positions of the components. The assembling portion 272 is further provided with a plurality of shafts 228 for transmitting fastening forces.

Another example of the sixth embodiment will be explained with reference to FIG. 20. As shown in FIG. 20, the assembling portion is divided into two assembling portions 272A and 272B, since the sunvisor 273 is to be fastened in a different direction from those of the other components 274, 276 and the like. The assembling portion 272A vertically moves, and the assembling portion 272B upwardly moves in a diagonal direction.

Figure 21:
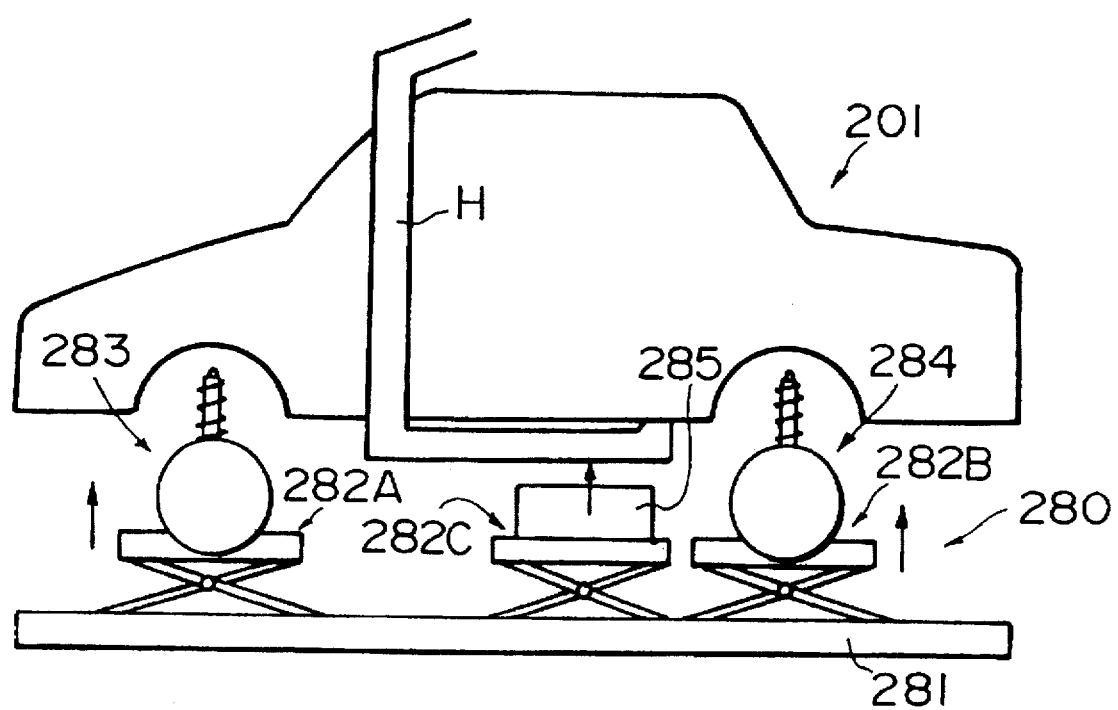
FIG. 21 is a side view showing an apparatus for assembling according to a seventh embodiment of the invention.
Figure 22:
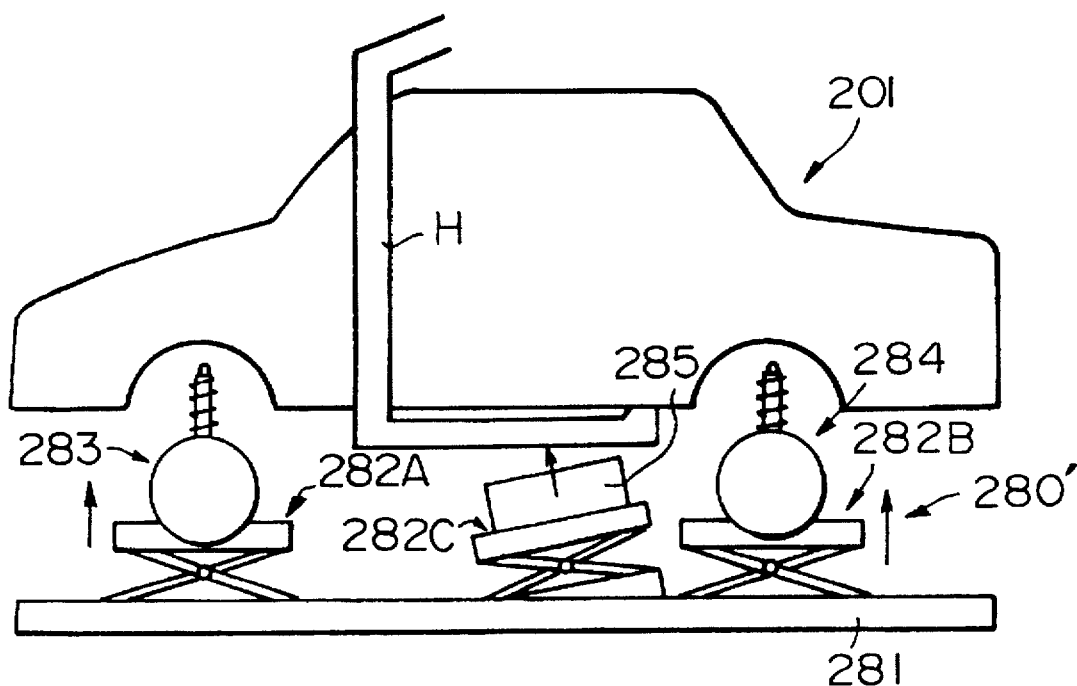
FIG. 22 is a side view showing an apparatus for assembling according to another example of the seventh embodiment of the invention.

A seventh embodiment of the present invention will be explained with reference to FIGS. 21 and 22. As shown in FIG. 21, an intermediate jig device 280 is provided to fasten a plurality of components to an under surface of the vehicle body 201. The components include a front-wheel suspension 283, a rear-wheel suspension 284, a fuel tank 285, and the like.

The intermediate jig device 280 is provided with a base portion 281 fixed on the predetermined location under the vehicle body 201 which is hung by a hanger H and assembling portions 282A, 282B and 282c on the base portion 281. The assembling portions 282A, 282B and 282c are vertically movable on the base portion 271 and carry the plurality of components to the assembling position to the under surface of the vehicle body 201 to assemble such the components.

The assembling portions 282A, 282B and 282c are respectively provided with supporting means (not shown) for supporting the components 283, 284, 285 and the like and shafts (not shown) for transmitting the fastening forces.

Another example of the seventh embodiment will be explained with reference to FIG. 22. As shown in FIG. 22, the assembling portions 282A and 282c move vertically, while the assembling portion 282B moves upwardly in a diagonal direction, so that an interference between the assembling portions 282A, 282B and 282c can be avoided when assembling or fastening the components.

Figure 23:
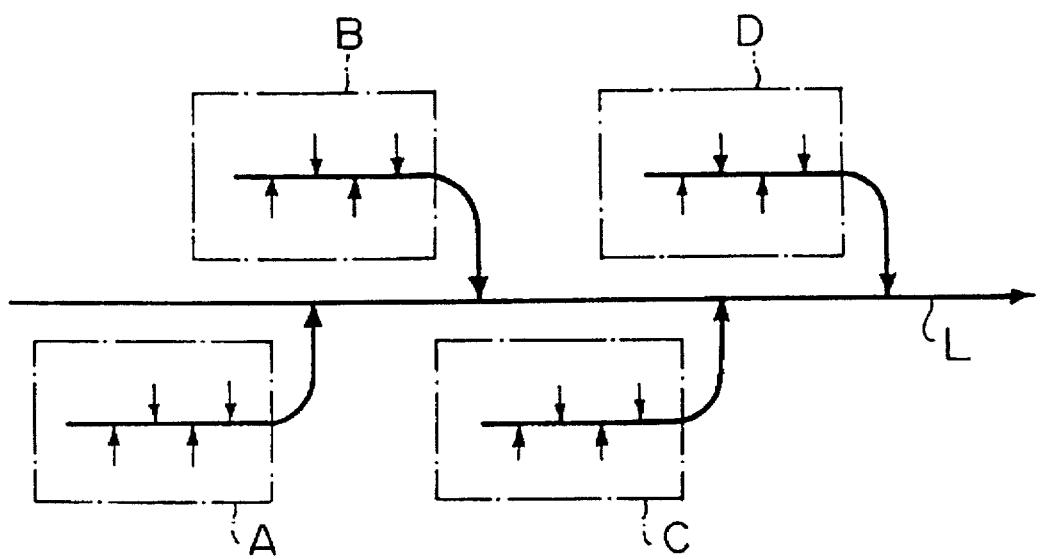
FIG. 23 is a general plan view showing an apparatus for assembling according to a eighth embodiment of the invention.

A eighth embodiment of the present invention will be explained with reference to FIGS. 23-27. As shown in FIG. 23, a conveyor line L for conveying vehicle bodies is provided and four sub-assembling stations A, B, C and D are located along the conveyor line L.

Figure 24:
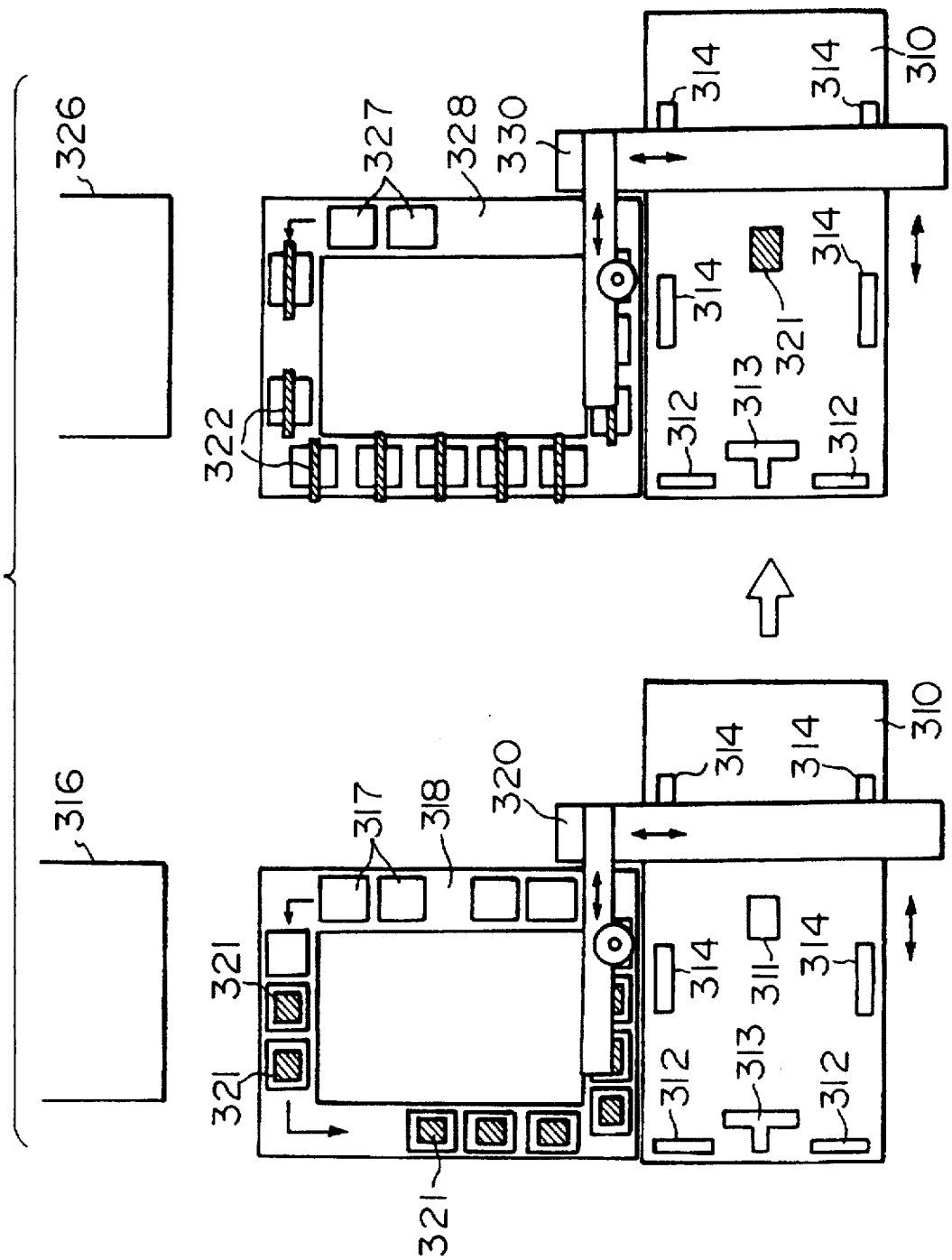
FIG. 24 is a plan view showing a sub-assembling station on which components are preset according to the eighth embodiment of the invention.

The sub-assembling station A is provided so as to preset components, which are to be fastened in a passenger compartment, on predetermined locations of an intermediate jig device 310 (see FIG. 24). The components include operational components such as an accelerator pedal, a brake pedal, a clutch pedal and the like and air conditioning components such as a blower unit, a heater unit and the like. The sub-assembling station B is provided so as to preset components, which are to be fastened in an engine room, on predetermined locations of the intermediate jig device 310. The components include a brake booster, a master cylinder, an oil filter, a charcoal canister and the like. The sub-assembling station C is provided so as to preset components, which are to be fastened on a roof in a passenger compartment, on predetermined locations of the intermediate jig device 310. The components include a room lamp, a room mirror, sunvisors, passenger handles and the like. The sub-assembling station D is provided so as to preset components, which are to be fastened on an under surface of the vehicle body, on predetermined locations of the intermediate jig device 310. The components include a front-wheel suspension, a rear-wheel suspension, a fuel tank and the like.

Next, the sub-assembling station C for example will be explained in detail. Referring to FIG. 24, in the sub-assembling station C, the intermediate jig device 310 is carried from the left hand side to the right hand side. The intermediate jig device 310 is provided with a room lamp setting portion 310 in the center, two sunvisor setting portions 312, a room mirror setting portion 13 and four passenger-handle setting portions 314 all of which correspond to assembling or fastening positions of the components.

The left side of FIG. 24 shows a first section in which a room lamp 321 is preset on the room lamp setting portion 311. The first section is provided with a component box 316 for pooling the room lamps 321, a circulating conveyor 317, a component table 318 on which the room lamp 321 is arranged by a robot (not shown) or by hand, and a robot 320 with three orthogonal three axes which presets the room lamp 321 on the table 318 to the room lamp setting portion 311.

The right side of FIG. 24 shows a second section in which the two sunvisors 322 are preset on the sunvisor setting portion 312. The second section is provided with a component box 326 for pooling the sunvisors 322, a circulating conveyor 327, a component table 328 on which the sunvisor 322 is arranged by a robot (not shown) or by hand, and a robot 330 with three orthogonal three axes which presets the sunvisors 322 on the table 328 to the sunvisor setting portion 312.

There are further provided a third section (not shown) for presetting the room mirror on the room mirror setting portion 313, and a fourth section (not shown) for presetting the four passenger handles to the passenger-handle setting portion 314. The third and fourth sections are located on the right hand side of the second section in FIG. 24.

The intermediate jig device 310 on which the components are preset in the four sections is carried to the location near the vehicle body conveyor line L.

Figure 25:
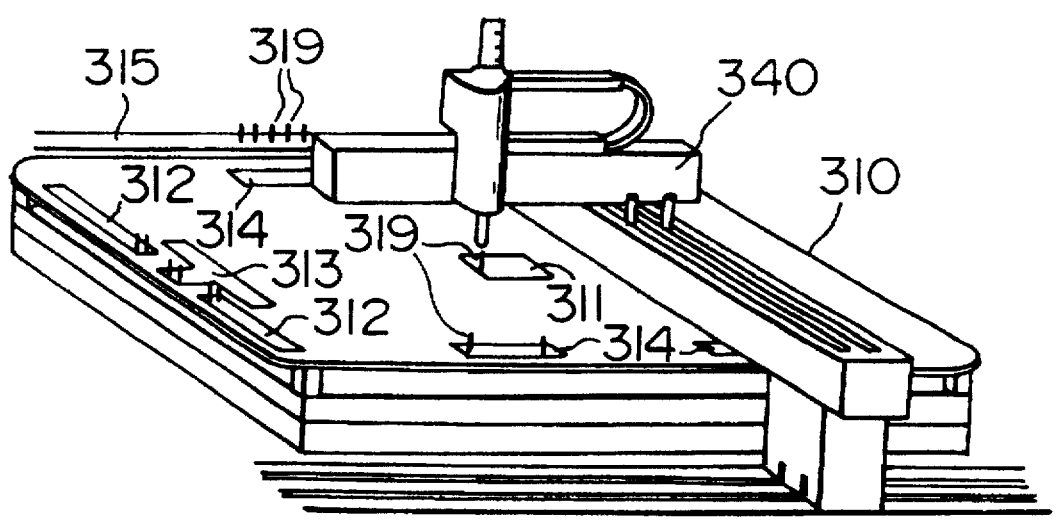
FIG. 25 is a plan view showing a sub-assembling station on which screws are preset according to the eighth embodiment of the invention.

Referring to FIG. 25, prior to the intermediate jig device 310 being carried to the first section in which the room lamp is at first preset thereon, screws 319 for fastening the components to the roof in the passenger compartment are preset in a screw setting section. The screws 319 are supplied by a parts feeder 315 and then preset on predetermined locations on the jig device 310 by a robot 340 with three orthogonal axes.

Figure 26:
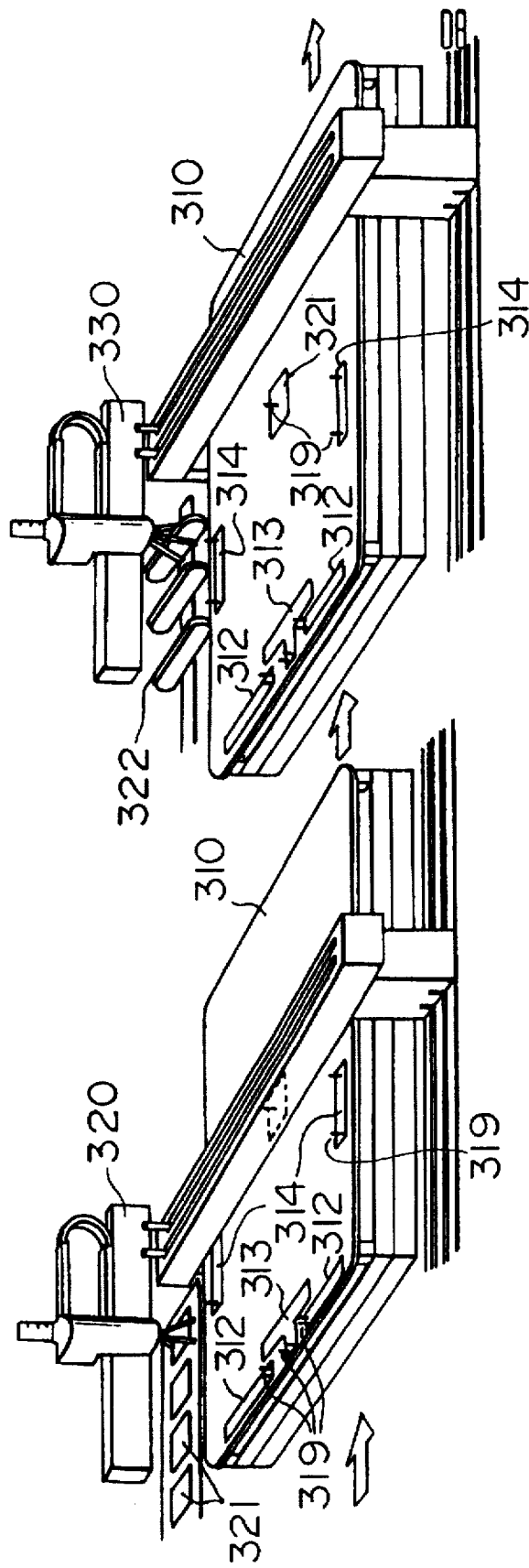
FIG. 26 is a perspective view showing a sub-assembling station on which components are preset according to the eighth embodiment of the invention.

Referring to FIG. 26, the room lamp 11 is preset on the intermediate jig device 310 by the robot 320 on the condition that the screw 319 is penetrating an opening of the lamp 11 and projecting upwardly. The sunvisors 322, the room mirror and the passenger handles are preset in the same manner.

An articulated robot may be employed instead of the robots 320, 330 and 340.

Figure 27:
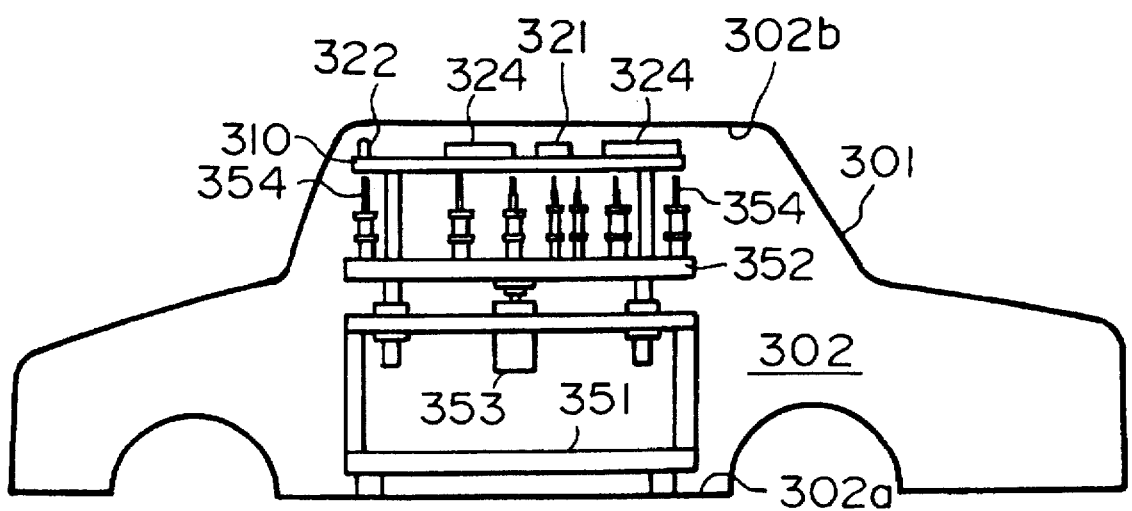
FIG. 27 is a side view showing that the components have been assembled to the roof in the passenger compartment according to the eighth embodiment of the invention.

Referring to FIG. 27, the intermediate jig device 310 on which the components 312-314 are preset is carried to the location near the vehicle body conveyor line L is mounted in the passenger compartment 302 of the vehicle body 301.

Referring to FIG. 27, a base table 351 is fixed on the floor 302a of the passenger compartment 302. An assembling table 352 is mounted on the base table 351 to move vertically by using a cylinder 353. The intermediate jig device 310 is mounted on the assembling table 352. The assembling table 352 is provided with a plurality of shafts 354 for transmitting fastening forces from an electric screw driver (not shown) to the screw 319. That is, the front portion of the shaft 354 contacts with the head of the screw 19 and the other end of the shaft 354 contacts with the electric screw driver.

Thus, the assembling table 352 moves upwardly so that the components 321-324 are located at the fastening positions, and thereafter the electric driver contacts with the end of the shaft 354. Then, the electric screw driver is operated to rotate the shaft 354, and thereafter the components 321-324 are fastened on the roof 302a in the passenger compartment 302.

While the present invention has been illustrated by preferred embodiments, one of ordinary skill in the art will recognize that modifications and improvements can be made while remaining within the spirit and scope of the invention. The scope of the invention is determined solely by the appended claims.

What is claimed is:

1. An apparatus for assembling a plurality of components at once to a motor vehicle comprising:
   supporting means for supporting the components at keeping locations which correspond to fastening positions on a vehicle body to which the components are to be fastened;
   carrying means for carrying the supporting means so that the components reach the fastening positions on the vehicle body; and
   transmitting means for transmitting fastening forces from an electric nut driver to the fastening positions, the transmitting means being supported by the supporting means, an input direction of the fastening forces being different from an output direction of the fastening forces;
   whereby the components are fastened, at the fastening positions, on the vehicle body.

2. An apparatus according to claim 1, wherein said carrying means includes a carriage frame which is positioned at a predetermined position in a passenger compartment of the motor vehicle.

3. An apparatus according to claim 1, wherein said transmitting means transmits the fastening forces through a plurality of sockets which are provided on a surface facing a door opening of the vehicle body.

4. An apparatus according to claim 1, wherein said supporting means supports the components by utilizing magnets.

5. An apparatus for assembling a plurality of components at once to a motor vehicle comprising:
   intermediate jig means including supporting means for supporting the components at keeping locations which correspond to fastening positions on a vehicle body to which the components are to be fastened and a plurality of shafts for transmitting fastening forces to the fastening positions;
   means for carrying the supporting means so that the components reach the fastening positions on the vehicle body; and
   fastening means movable against the intermediate jig means for fastening the components at the fastening positions on the vehicle body through the shafts, the fastening means being supported by the intermediate jig means and movable between respective shafts.

6. An apparatus according to claim 5, wherein said fastening means includes an electric nut driver which is moved by a robot with three orthogonal axes.

7. An apparatus according to claim 6, wherein said electric nut driver is controlled so as to have a changeable moving path.

8. An apparatus according to claim 5, wherein said shafts are divided into a plurality of blocks, and said fastening means includes a multiple-shaft electric nut driver which transmits the fastening forces to respective blocks of the shafts.

9. An apparatus according to claim 5, wherein said fastening forces are controlled so as to be changeable based on kinds of the components to be fastened.

10. An apparatus according to claim 5, wherein said intermediate jig means further includes a base portion on which the supporting means is movable and the fastening means is supported by the supporting means.

11. A method of assembling a plurality of components at once to a motor vehicle comprising the steps of:
   providing intermediate jig means which includes supporting means for supporting the components at keeping locations which correspond to fastening positions on a vehicle body to which the components are to be fastened and transmitting means for transmitting fastening forces through a plurality of sockets to the fastening positions on the vehicle body, the transmitting means being supported by the supporting means, an input direction of the fastening forces being different from an output direction of the fastening forces;
   carrying the supporting means so that the components reach the fastening positions on the vehicle body; and
   fastening the components to the vehicle body by using an electric nut driver connected to the sockets of the intermediate jig means.

12. A method according to claim 11, wherein said method further comprises the step of positioning the intermediate jig means at a predetermined location in a passenger compartment of the vehicle body prior to carrying the supporting means.

13. A method according to claim 12, wherein said components are fastened in the passenger compartment of the vehicle body.

14. A method according to claim 11, wherein said plurality of sockets is provided on a surface facing a door opening of the vehicle body.

15. A method of assembling a plurality of components at once to a motor vehicle comprising the steps of:

providing intermediate jig means which includes supporting means for supporting the components at keeping locations which correspond to fastening positions on a vehicle body to which the components are to be fastened and a plurality of shafts for transmitting fastening forces from fastening means to the fastening positions, the fastening means being supported by the intermediate jig means;

carrying the supporting means so that the components reach the fastening positions on the vehicle body; and moving the fastening means between respective shafts of the intermediate jig means to connect to the shafts and fastening the components to the fastening positions on the vehicle body.

* * * * *